United States Patent [19]
Cohen et al.

[11] 3,961,136
[45] June 1, 1976

[54] DIGITAL DATA TRANSMIT AND RECEIVE CHANNEL MODEM

[75] Inventors: Stuart Barry Cohen, Nutley; James Monroe Clark, Cedar Grove; Arthur Howard Magnus, Succasunna, all of N.J.

[73] Assignee: International Telephone and Telegraph Corporation, Nutley, N.J.

[22] Filed: Apr. 25, 1975

[21] Appl. No.: 571,677

[52] U.S. Cl. .................................... 178/67; 325/30
[51] Int. Cl.² .......................................... H04L 27/18
[58] Field of Search ............... 178/66 R, 67, 69.5 R; 325/17, 30, 41, 42, 45; 179/15 BV, 15.55 R; 343/175, 179

[56]  References Cited
UNITED STATES PATENTS

| | | | |
|---|---|---|---|
| 3,472,960 | 10/1969 | Gutleber et al. | 178/67 |
| 3,758,720 | 9/1973 | Dinn | 178/67 |
| 3,806,647 | 4/1974 | Dohne et al. | 325/41 |

*Primary Examiner*—Benedict V. Safourek
*Attorney, Agent, or Firm*—John T. O'Halloran; Menotti J. Lombardi, Jr.; Alfred C. Hill

[57]  ABSTRACT

A transmit phase locked loop receives data to be transmitted having a bit rate equal to a first given one of a predetermined number of different bit rates. A diphase demodulator responds to the transmit phase locked loop and the data to be transmitted to provide output data for transmission. A receive write timing signal and a receive read timing signal is coupled to a receive phase locked loop to compare the phase relation of the two timing signals. A diphase modulator responds to received data having a bit rate equal to a second given one of the predetermined number of different bit rates and a clock signal provided by the receive phase locked loop to provide output data for utilization. The first given one of different bit rates and the second given one of different bit rates may have equal or different bit rates.

20 Claims, 6 Drawing Figures

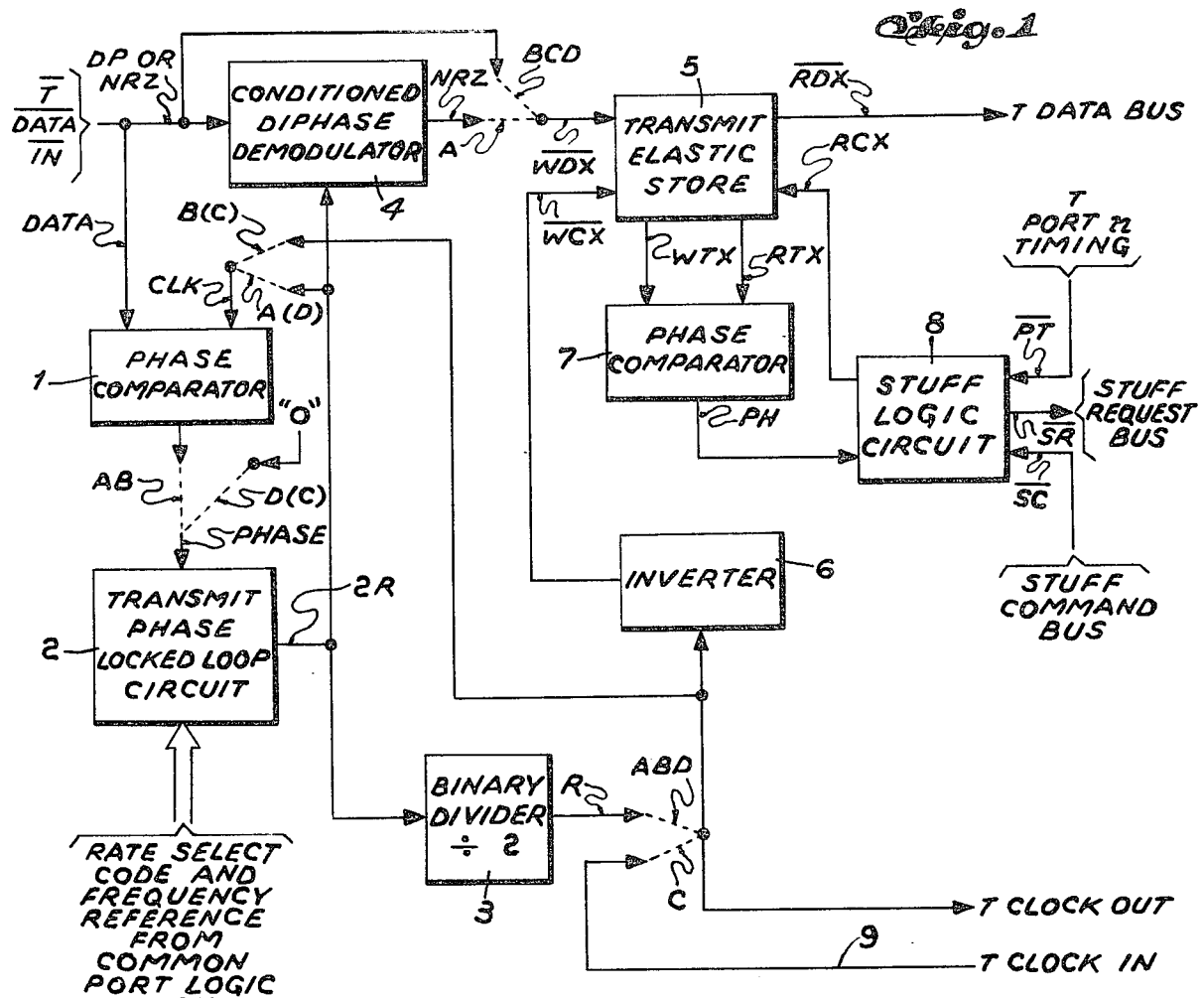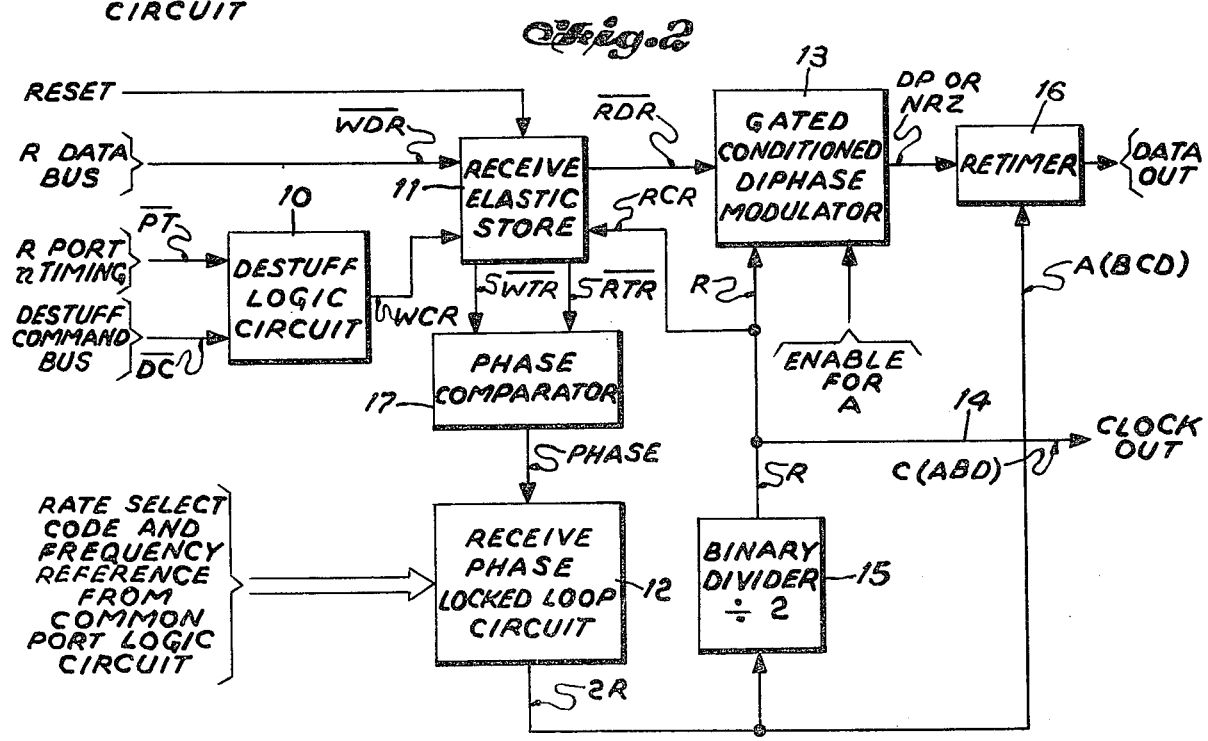

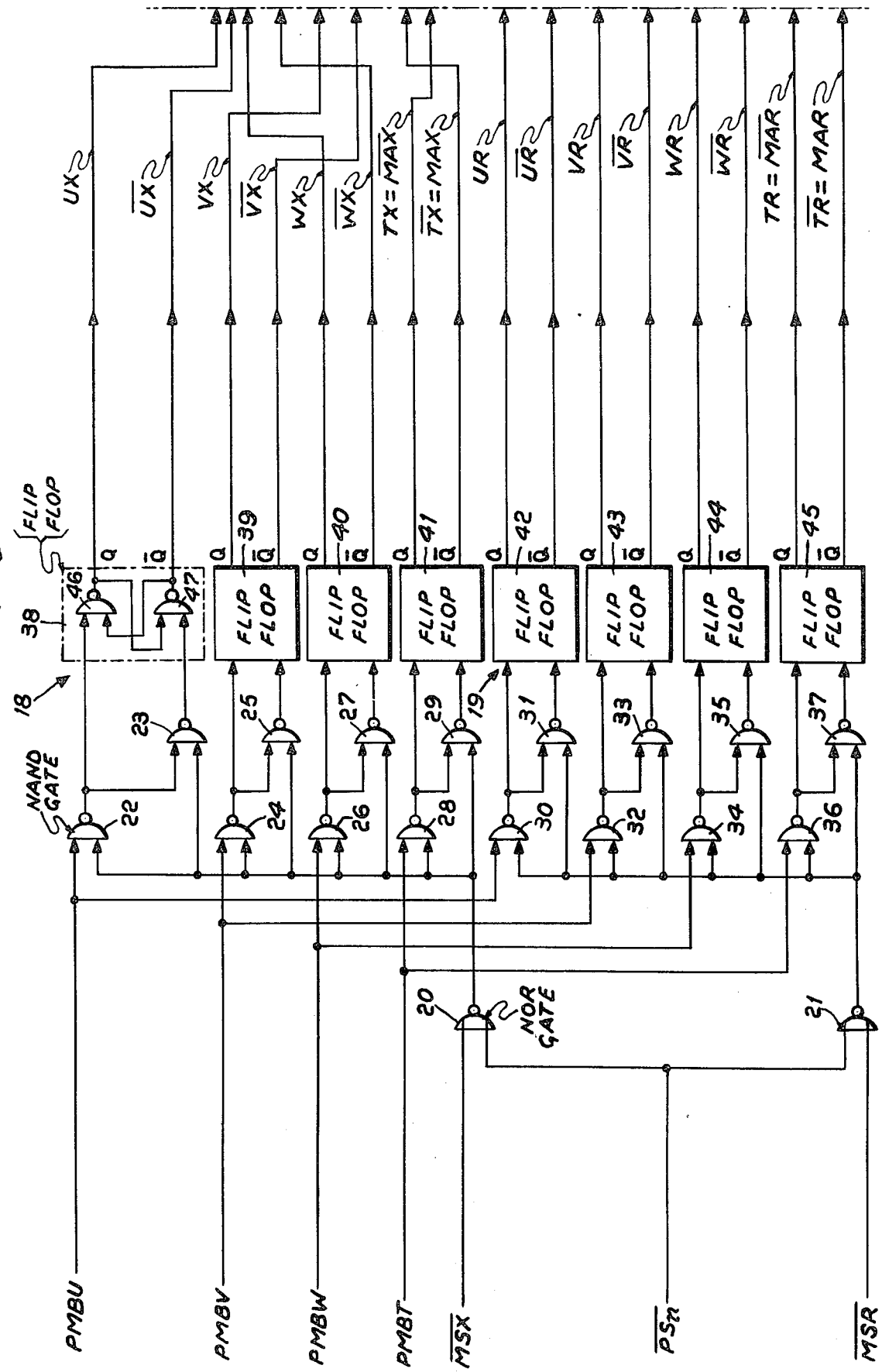

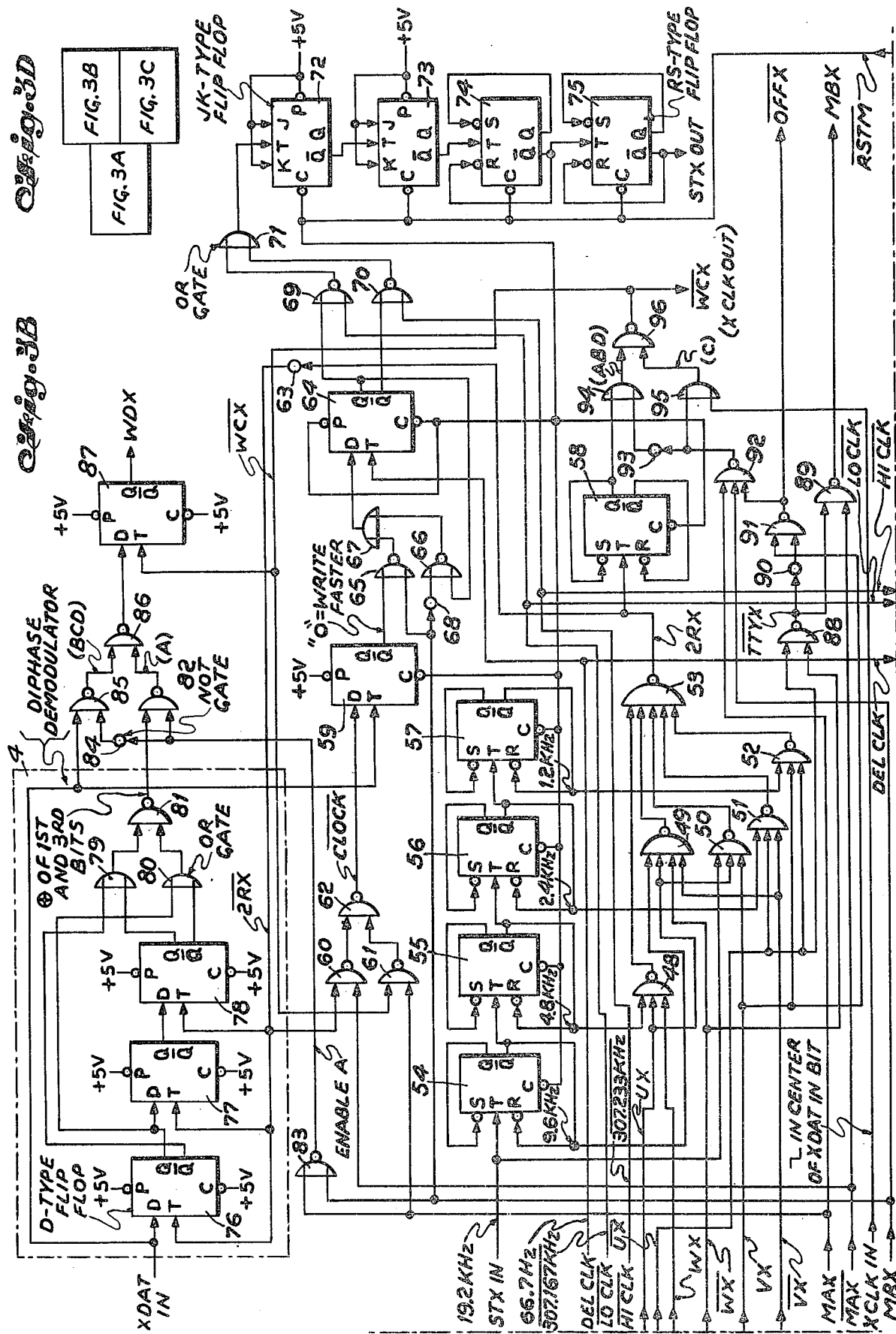

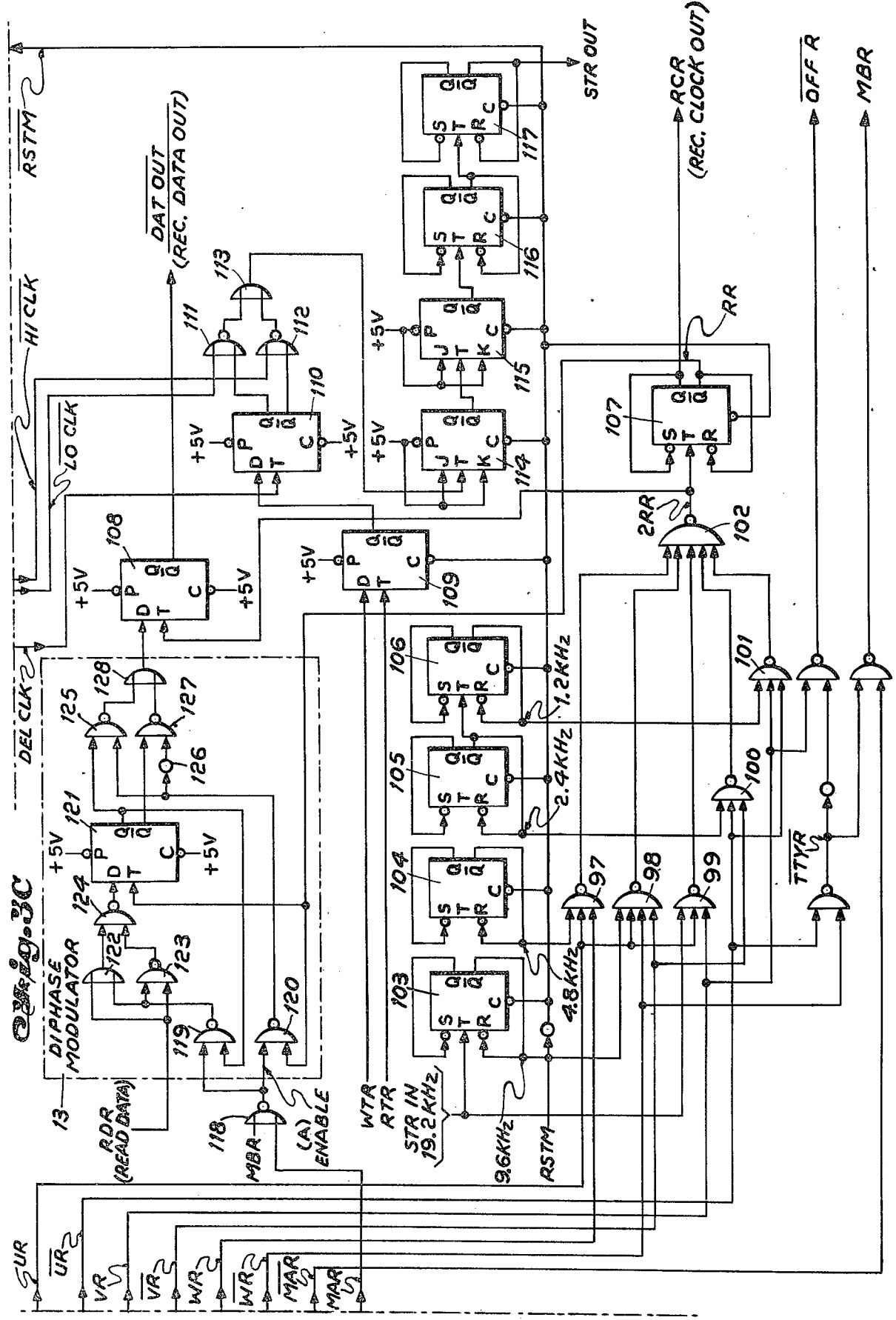

DIGITAL DATA TRANSMIT AND RECEIVE CHANNEL MODEM

BACKGROUND OF THE INVENTION

This invention relates to digital data time division multiplex (TDM) systems and more particularly to transmit and receive channel circuitry employed in such systems.

SUMMARY OF THE INVENTION

An object of the present invention is to provide a combined digital data transmit and receive channel modem for employment in digital data TDM systems.

Another object of the present invention is to provide a digital data channel modem handling both transmitted and received digital data for employment in digital data systems.

A feature of the present invention is the provision of a digital data transmit and receive channel modem comprising: a first source of data to be transmitted having a bit rate equal to a first given one of a predetermined number of different bit rates; a transmit phase locked loop coupled to the first source; a diphase demodulator coupled to the first source and the transmit phase locked loop to provide output data for transmission; a second source of received data having a bit rate equal to a second given one of said predetermined number of different bit rates; a third source of a receive write timing signal; a fourth source of a receive read timing signal; a receive phase locked loop coupled to the third and fourth sources; and a diphase modulator coupled to the second source and the receive phase locked loop to provide output data for utilization.

Another feature of the present invention is that the first given one of different bit rates and the second given one of different bit rates as specified immediately above may have equal or different bit rates.

BRIEF DESCRIPTION OF THE DRAWINGS

Above-mentioned and other features and objects of this invention will become more apparent by reference to the following description taken in conjunction with the accompanying drawing, in which:

FIG. 1 is a block diagram of transmit channel circuitry in accordance with the principles of the present invention;

FIG. 2 is a block diagram of receive channel circuitry in accordance with the principles of the present invention; and FIGS. 3A, 3B and 3C, when organized as illustrated in FIG. 3D, is the logic diagram of a combined digital data transmit and receive channel modem in accordance with the principles of the present invention.

DESCRIPTION OF THE PREFERRED EMBODIMENT

FIGS. 1 and 2 are block diagrams of a transmit channel or port modem and receive channel or port modem that may be used in, and is described as if used in, the multiplexer and demultiplexer disclosed in the copending patent application of J. M. Clark, S. B. Cohen and A. H. Magnus Ser. No. 565,905, filed Apr. 7, 1975, whose disclosure is incorporated herein by reference. It is to be noted, however, that these modems may be employed as sub-systems of other types of digital data systems.

Referring to FIG. 1, there is disclosed therein a block diagram of a transmit channel modem. Four modes, A, B, C and D are possible by re-routing certain signals as shown by the broken lines. Mode A is used for CDP (conditioned diphase) data. Phase comparator 1 is connected to compare CDP data with the 2R clock (twice the bit rate). The output of phase comparator 1 is connected to the transmit phase locked loop circuit 2, which selects either a high frequency reference (307.233 KHz (kilohertz)) or a low frequency reference (307.167 KHz) according to the phase error. The selection is allowed to change whenever the high and low frequency references are in phase which occurs at a 66.7 Hz (hertz) rate (the difference frequency between the high and low frequency references). By dividing down from the nominal 307.2 KHz clock in binary divider 3 the required bit rate R is obtained. The rate select code is strobed from the transmit rate select bus and stored in latches in circuit 2, which control the selection of the bit rate.

The NRZ output of the CDP demodulator 4 is clocked into the transmit elastic store 5 by the extracted R (data rate) clock through inverter 6. Phase comparator 7 compares the phase of the write and read counters of elastic store 5, enabling the stuff logic circuit 8 to generate a stuff request pulse when elastic store 5 is less than half full. When the common stuff control logic (not shown) issues a stuff command pulse, one read clock pulse is inhibited, causing one data bit in the elastic store 5 to be read twice.

Mode B is not normally used. If necessary, however, mode B could be used to extract a clock from NRZ data for which a clock signal has not been provided.

Mode C is used for NRZ data, which is caused to by-pass demodulator 4. Phase locked loop circuit 2 is not used for mode C, because the transmit clock input 9 is used as the write clock for elastic store 5. The remaining circuitry operates the same as for mode A.

Mode D is used for TTY (telemetry) inputs. In this case phase comparator 7 is connected in a toggle mode (toggling between + and − phase error is equivalent to zero phase error). In this mode, phase locked loop circuit 2 operates at the nominal 307.2 KHz rate. This smoothed clock is employed to sample the TTY data at 1200 Hz which minimizes the increase of TTY timing distortion.

Referring to FIG. 2, there is illustrated therein a block diagram of a receive channel modem. For all modes the destuff logic circuit 10 inhibits the generation of a write clock pulse for receive elastic store 11 from a port timing pulse whenever a destuff command pulse occurs. The receive phase locked loop circuit 12 uses the same reference frequencies as transmit phase locked loop circuit 2 (FIG. 1), although the rate selection may be different. The 3db (decibel) jitter bandwidth of receive phase locked loop circuit 12 has been computed to be 34.5 parts per million (0.0000345) of the bit rate. There is a provision to reset receive elastic store 11 to a half-full state when the framing circuit is out of sync. When frame synchronization is acquired, the receive elastic stores of all of the receive channel modems start operating from the half-full state. Phase comparator 17 compares the phase of the receive write timing signal WTR and a receive read timing signal RTR from elastic store 11 to provide a phase error signal to control receive phase locked loop circuit 12. The gated conditioned diphase modulator 13 is gated by the enable signal "ENABLE FOR A" to the retimer 56 and hence the data output is CDP data for mode A and NRZ data otherwise. For mode D, the NRZ data is actually a reconstruction of the TTY data. The receive clock output 14 from binary divider 15 is enabled only for mode C (NRZ data mode). Tables I and II summarize the modes discussed hereinabove with respect to FIGS. 1 and 2.

TABLE I

| MODE | CODE MA | MB | | | FOR TDDM |
|---|---|---|---|---|---|
| A | 0 | 0 | Conditioned Diphase | Extract clock from data | Conditioned Diphase |
| B | 1 | 0 | NRZ data only | | Not used |
| C | 1 | 1 | NRZ data/clock in | | NRZ |
| D | 0 | 1 | NRZ data/clock out | | TTY |

TABLE II

| MODE | TTL | TTY | MA | MB |
|---|---|---|---|---|
| A | NO | NO | 0 | 0 |
| C | YES | NO | 1 | 1 |
| D | NO | YES | 0 | 1 |

FIGS. 3A, 3B, and 3C, when organized as illustrated in FIG. 3D, is the logic diagram of a combined digital data transmit and receive modem having the same operation as the separate transmit and receive modems of FIGS. 1 and 2. The transmit and receive modem may be realized in practice as an LSI (large scale integrated) (SSI/MSI (small scale integrated/medium scale integrated) equivalent) integrated circuit package employing low threshold MOS (metal oxide semiconductor) P-channel transistors in an enhancement mode.

The logic diagram of elastic stores 5 and 11 of FIGS. 1 and 2 and stuff logic circuit 8 and destuff logic circuit 10 of FIGS. 1 and 2 are fully disclosed in the copending application of S. B. Cohen, J. M. Clark and A. H. Magnus, Ser. No. 541,558, filed Jan. 16, 1975, whose disclosure is incorporated herein by reference.

One of each of the different logic symbols employed have been identified by an appropriate label in FIGS. 3A and 3B to provide a logic symbol key for similarly shown logic symbols in FIGS. 3A, 3B and 3C.

FIG. 3A illustrates the mode and rate select registers, FIG. 3B illustrates the transmit clock extraction phase locked loop and conditioned diphase demodulator and FIG. 3C illustrates the receive clock smoother phase locked loop and conditioned diphase modulator.

With particular reference to FIG. 3A the U, V, W, and T bits of the port mode bus PMB are loaded into one of two four-bit latch or flip-flop registers 18 and 19 under control of the transmit mode strobe $\overline{MSX}$, the receive mode strobe $\overline{MSR}$ and the port select pulse $\overline{PS}_n$ via NOR gates 20 and 21 and NAND gates 22-37. Each of registers 18 and 19 include four flip-flop stages 38-41 and stages 42-45, respectively. Each of these flip-flops 38-45 include NAND gates 46 and 47 interconnected as illustrated in flip-flop 38. The UX, $\overline{UX}$, VX, $\overline{VX}$, WX, $\overline{WX}$ from flip-flops 38-40 are transmit rate code bits and the $\overline{MAX}$ and MAX outputs from flip-flop 41 are transmit mode codes while the outputs from flip-flops 42-44, namely UR, $\overline{UR}$, VR, $\overline{VR}$, WR and $\overline{WR}$ are receive rate code bits and the output of flip-flop 45, namely, $\overline{MAR}$ and MAR are receive mode codes.

The transmit rate codes and mode codes are coupled to FIG. 3B and more particularly to a multiplexer including NAND gates 48-53 to select a 2RX rate (twice the selected bit rate) with the predetermined number of different bit rates being derived from the input transmit system timing frequency STXIN and the divide by sixteen binary divider including RS-type flip-flops 54-57. The output of NAND gate 53 is coupled to a one-stage RS-type flip-flop 58 to derive a transmit clock output $\overline{WCX}$ having a rate R. NAND gate 88 and NOT gate 90 together with NAND gate 91 and 92, NOT gate 93, OR gates 94 and 95 and NAND gate 96 cooperate with the Q output of RS-type flip-flop 58 to generate the clock signal $\overline{WCX}$.

The data to be transmitted XDATIN is coupled to diphase demodulator 4 and also to phase comparator 1 in the form of a D-type flip-flop 59 which compares the data to be transmitted XDATIN with a $\overline{CLOCK}$ signal derived from the $\overline{WCX}$ clock with the aid of the $\overline{MAX}$ and MAX mode codes in NAND gates 60, 61 and 62. The 2RX clock derived from NOT gate 63 coupled to the output of NAND gate 53 also enters into the generation of the $\overline{CLOCK}$ signal for comparison in flip-flop 59. A DELCLK frequency reference 66.7 Hz, a $\overline{LOCLK}$ low frequency reference = 307.167 KHz and a $\overline{HICLK}$ high frequency reference = 307.233 KHz are provided with the DELCLK frequency reference sampling the input of D-type flip-flop 64 received from flip-flop 59 through NOR gates 65 and 66, OR gate 67 and NOT gate 68. NOR gate 69 is coupled to the Q output of flip-flop 64 and to the $\overline{LOCLK}$ frequency reference and NOR gate 70 is coupled to the $\overline{Q}$ output of flip-flop 64 and to the $\overline{HICLK}$ frequency reference. The outputs of NOR gates 69 and 70 are coupled to OR gate 71 to select in accordance with the error phase output of flip-flop 59 at the rate of DELCLK signal either the $\overline{LOCLK}$ or the $\overline{HICLK}$ frequency reference. The selected one of the frequency references is then coupled to a divide by sixteen circuit including JK type flip-flops 72 and 73 and RS-type flip-flops 74 and 75.

The diphase demodulator 4 includes a three stage shift register including D-type flip-flops 76, 77 and 78. The Q and $\overline{Q}$ output of the first flip-flop 76 of the shift register and the Q and $\overline{Q}$ output of the third stage 78 of the shift register are coupled to an EXCLUSIVE-OR circuit including OR gates 79 and 80 and NAND gate 81 to provide at the output of NAND gate 81 an EXCLUSIVE-OR function of the first and third bits stored, respectively, in the first and third stages of the shift register. The output of NAND gate 81 is coupled to NAND gate 82 whose other input is coupled to the output of NOR gate 83 which provides an enable signal for mode A from the mode code input signals MAX and MBX. This enable signal is also coupled through NOT gate 84 to NAND gate 85 whose other input is coupled to the data to be transmitted input conductor. The output of NAND gates 82 and 83 are coupled to NAND gate 86 to provide a transmit write data signal WDX which is retimed by the clock $\overline{WCX}$ in D-type flip-flop 87.

NAND gates 88 and 89 cooperate to produce mode code MBX.

The receive rate code bits and the receive mode codes are coupled from FIG. 3A to a rate selector (FIG. 3C) including NAND gates 97-102 to select the appropriate one of the predetermined number of different bit rates generated from the input receive system timing STRIN in the divide by sixteen binary divider including RS-type flip-flops 103-106. The double bit rate clock 2RR is present at the output of NAND gate 102 and is divided by two in the RS-type flip-flop 107 to produce a receive clock output RCR and also a receive bit clock $\overline{RR}$ which is employed in the diphase modulator 13. The 2RR output of NAND gate 102 clocks the D-type flip-flop 108 to retime the receive data output $\overline{DATOUT}$ from the diphase modulator 13.

Phase comparator 17 includes a D-type flip-flop 109 which compares the phase of the receive write timing signal and the receive read timing signal WTR and RTR, respectively. The Q output of flip-flop 109 is coupled to D-type flip-flop 110 which is sampled by the DELCLK clock from FIG. 3B. NOR gate 111 is coupled to the Q output of flip-flop 110 and the $\overline{LOCLK}$ clock from FIG. 3B and NOR gate 112 is coupled to $\overline{Q}$ output of flip-flop 110 and to the $\overline{HICLK}$ clock from FIG. 3B. OR gate 113 coupled to the outputs of gates 111 and 112 selects in accordance with the phase error signal at the output of flip-flop 109 the appropriate one of the $\overline{LOCLK}$ and $\overline{HICLK}$ frequency reference for application to a divide by sixteen binary divider to produce the receive system timing output signal. This divider includes JK-type flip-flops 114 and 115 and RS-type flip-flops 116 and 117.

NOR gate 118 produces and enable signal for mode (A) from the mode codes signals MBR and MAR with this enable signal being coupled to NAND gates 119 and 120 forming a portion of diphase modulator 13. The other input of NAND gate 119 is coupled to the Q output of D-type flip-flop 121 of modulator 13 and the other input of NAND gate 120 receives the $\overline{RR}$ output from flip-flop 107. Flip-flop 121 is also sampled by this same clock signal. The received data RDR is coupled to OR gate 122 and NAND gate 123 with the other input of these two gates being provided by the output of gate 119. The outputs of gates 122 and 123 are coupled to NAND gate 124 and hence to the D input of flip-flop 121. NAND gate 125 is coupled to the $\overline{Q}$ output of flip-flop 121 and also to the output of gate 120. A NOT gate 126 is coupled to the output of gate 120. NAND gate 127 is coupled to the Q output of flip-flop 121 and the output of gate 126. The outputs of gates 125 and 127 provide the inputs for OR gate 128 which is the receive data output prior to retiming in flip-flop 108.

While we have described above the principles of our invention in connection with specific apparatus it is to be clearly understood that this description is made only by way of example and not as a limitation to the scope of our invention as set forth in the objects thereof and in the accompanying claims.

We claim:

1. A digital data transmit and receive channel modem comprising:
    a first source of data to be transmitted having a bit rate equal to a first given one of a predetermined number of different bit rates;
    a transmit phase locked loop coupled to said first source;
    a diphase demodulator coupled to said first source and said transmit phase locked loop to provide output data for transmission;
    a second source of received data having a bit rate equal to a second given one of said predetermined number of different bit rates;
    a third source of a receive write timing signal;
    a fourth source of a receive read timing signal;
    a receive phase locked loop coupled to said third and fourth sources; and
    a diphase modulator coupled to said second source and said receive phase locked loop to provide output data for utilization.

2. A channel modem according to claim 1, wherein said transmit phase locked loop includes
    a first means to select said first given one of said predetermined number of different bit rates for a clock signal,
    a phase comparator coupled to said first source and said first means to compare said data to be transmitted to said clock signal and to produce a phase error signal,
    a fifth source of a low frequency reference having a first given value,
    a sixth source of a high frequency reference having a second given value higher than said first given value,
    a seventh source of a delta frequency reference having a value equal to the difference between said first and second given values,
    second means coupled to said phase comparator and said fifth, sixth and seventh sources to select one of said low and high frequency references at the rate of said delta frequency reference as determined by said phase error signal, and
    third means coupled to said second means to divide said selected one of said low and high frequency references to provide a transmit system timing signal.

3. A channel modem according to claim 2, wherein said phase comparator includes a first D-type flip-flop.

4. A channel modem according to claim 3, wherein said second means includes
    a second D-type flip-flop coupled to said first D-type flip-flop and said seventh source,
    a first NOR gate coupled to the Q output of said second D-type flip-flop and said fifth source,
    a second NOR gate coupled to the Q output of said second D-type flip-flop and said sixth source, and
    an OR gate coupled to the output of both said first and second NOR gates.

5. A channel modem according to claim 4, wherein said third means includes
    a four stage flip-flop binary divider coupled to the output of said OR gate.

6. A channel modem according to claim 2, wherein said second means includes
    a D-type flip-flop coupled to said phase comparator and said seventh source,
    a first NOR gate coupled to the Q output of said D-type flip-flop and said fifth source,
    a second NOR gate coupled to the Q output of said D-type flip-flop, and
    an OR gate coupled to the output of both said first and second NOR gates.

7. A channel modem according to claim 2, wherein said third means includes
a four stage flip-flop binary divider coupled to the output of said second means.

8. A channel modem according to claim 1, wherein said diphase demodulator includes
a three stage shift register coupled to said first source,
an EXCLUSIVE-OR circuit coupled to the first and third stages of said shift register to provide an EXCLUSIVE-OR function at its output of the first and third bits stored in the first and third stages of said shift register,
an enable pulse source,
a first NAND gate coupled to the output of said EXCLUSIVE-OR circuit and said enable pulse source,
a NOT gate coupled to said enable pulse source,
a second NAND gate coupled to said first source and the output of said NOT gate, and
a third NAND gate coupled to the output of both said first and second NAND gates to provide said output data for transmission.

9. A channel modem according to claim 1, wherein said receive phase locked loop includes
a first means to select said second given one of said predetermined number of different bit rates for a clock signal,
a phase comparator coupled to said third and fourth sources to compare said receive write timing signal to said receive read timing signal and to produce a phase error signal,
a fifth source of a low frequency reference having a first given value,
a sixth source of a high frequency reference having a second given value higher than said first given value,
a seventh source of a delta frequency reference having a value equal to the difference between said first and second given values,
second means coupled to said phase comparator and said fifth, sixth and seventh sources to select one of said low and high frequency references at the rate of said delta frequency reference as determined by said phase error signal, and
third means coupled to said second means to divide said selected one of said low and high frequency references to provide a receive system timing signal.

10. A channel modem according to claim 9, wherein said phase comparator includes
a first D-type flip-flop.

11. A channel modem according to claim 10, wherein said second means includes
a second D-type flip-flop coupled to said first D-type flip-flop and said seventh source,
a first NOR gate coupled to the Q output of said second D-type flip-flop and said fifth source,
a second NOR gate coupled to the $\overline{Q}$ output of said second D-type flip-flop and said sixth source, and
an OR gate coupled to the output of both said first and second NOR gates.

12. A channel modem according to claim 11, wherein said third means includes
a four stage flip-flop binary divider coupled to the output of said OR gate.

13. A channel modem according to claim 9, wherein said second means includes
a D-type flip-flop coupled to said phase comparator and said seventh source,
a first NOR gate coupled to the Q output of said D-type flip-flop and said fifth source,
a second NOR gate coupled to the $\overline{Q}$ output of said D-type flip-flop, and
an OR gate coupled to the output of both said first and second NOR gates.

14. A channel modem according to claim 9, wherein said third means includes
a four stage flip-flop binary divider coupled to the output of said second means.

15. A channel modem according to claim 1, wherein said diphase modulator includes
an enable pulse source,
a clock signal source,
a D-type flip-flop having its T input coupled to said clock source,
a first NAND gate coupled to said enable pulse source and said clock signal source,
a second NAND gate coupled to said enable pulse source and the Q output of said D-type flip-flop,
a third NAND gate coupled to said second source and the output of said second NAND gate,
a first OR gate coupled to said second source and the output of said second NAND gate,
a fourth NAND gate coupled between the output of both of said third NAND and said first OR gate and the D input of said D-type flip-flop,
a NOT gate coupled to the output of said first NAND gate,
a fifth NAND gate coupled to the $\overline{Q}$ output of said D-type flip-flop and said NOT gate,
a sixth NAND gate coupled to the Q output of said D-type flip-flop and said first NAND gate, and
a second OR gate coupled to the output of both of said fifth and sixth NAND gates to provide said output data for utilization.

16. A channel modem according to claim 1, wherein said first given one and said second given one of said predetermined number of different bit rates are equal.

17. A channel modem according to claim 1, wherein said first given one and said second given one of said predetermined number of different bit rates are different.

18. A channel modem according to claim 1, wherein said transmit phase locked loop includes
a first means to select said first given one of said predetermined number of different bit rates for a clock signal,
a phase comparator coupled to said first source and said first means to compare said data to be transmitted to said clock signal and to produce a phase error signal,
a fifth source of a low frequency reference having a first given value,
a sixth source of a high frequency reference having a second given value higher than said first given value,
a seventh source of a delta frequency reference having a value equal to the difference between said first and second given values,
second means coupled to said phase comparator and said fifth, sixth and seventh sources to select one of said low and high frequency references at the rate of said delta frequency reference as determined by said phase error signal, and
third means coupled to said second means to divide said selected one of said low and high frequency references to provide a transmit system timing signal; and said diphase demodulator includes
a three stage shift register coupled to said first source and said first means,
an EXCLUSIVE-OR circuit coupled to the first and third stages of said shift register to provide an EXCLUSIVE-OR function at the output of the first and third bits stored in the first and third stages of said shift register,
an enable pulse source,
a first NAND gate coupled to the output of said EXCLUSIVE-OR circuit and said enable pulse source,
a NOT gate coupled to said enable pulse source,
a second NAND gate coupled to said first source and the output of said NOT gate, and
a third NAND gate coupled to the output of both said first and second NAND gates to provide said output data for transmission.

19. A channel modem according to claim 1, wherein said receive phase locked loop includes
a first means to select said second given one of said predetermined number of different bit rates for a clock signal,
a phase comparator coupled to said third and fourth sources to compare said receive write timing signal to said receive read timing signal and to produce a phase error signal,
a fifth source of low frequency reference having a first given value,
a sixth source of high frequency reference having a second given value higher than said first given value,
a seventh source of a delta frequency reference having a value equal to the difference between said first and second given values,
second means coupled to said phase comparator and said fifth, sixth and seventh sources to select one of said low and high frequency references at the rate of said delta frequency reference as determined by said phase error signal, and
third means coupled to said second means to divide said selected one of said low and high frequency references to provide a receive system timing signal; and
said diphase modulator includes
an enable pulse source,
a D-type flip-flop having its T input coupled to said first means responsive to said clock signal,
a first NAND gate coupled to said enable pulse source and said first means responsive to said clock signal,
a second NAND gate coupled to said enable pulse source and the Q output of said D-type flip-flop,
a third NAND gate coupled to said second source and the output of said second NAND gate,
a first OR gate coupled to said second source and the output of said second NAND gate,
a fourth NAND gate coupled between the output of both said third NAND gate and said first OR gate and the D input of said D-type flip-flop,
a NOT gate coupled to the output of said first NAND gate,
a fifth NAND gate coupled to the Q output of said D-type flip-flop and said NOT gate,
a sixth NAND gate coupled to the Q output of said D-type flip-flop and said first NAND gate, and
a second OR gate coupled to the output of both said fifth and sixth NAND gates to provide said output data for utilization.

20. A channel modem according to claim 1, wherein said transmit phase locked loop includes
a first means to select said first given one of said predetermined number of different bit rates for a first clock signal,
a first phase comparator coupled to said first source and said first means to compare said data to be transmitted to said first clock signal and to produce a first phase error signal,
a fifth source of a first low frequency reference having a first given value,
a sixth source of a second high frequency reference having a second given value higher than said first given value,
a seventh source of a first delta frequency reference having a value equal to the difference between said first and second given values,
second means coupled to said first phase comparator and said fifth, sixth and seventh sources to select one of said first low and first high frequency references at the rate of said first delta frequency reference as determined by said first phase error signal, and
third means coupled to said second means to divide said selected one of said first low and first high frequency references to provide a transmit system timing signal;
said diphase demodulator includes
a three stage shift register coupled to said first source and said first means,
an EXCLUSIVE-OR circuit coupled to the first and third stages of said shift register to provide an EXCLUSIVE-OR function at its output of the first and third bits stored in the first and third stages of said shift register,
a first enable pulse source,
a first NAND gate coupled to the output of said EXCLUSIVE-OR circuit and said first enable pulse source,
a first NOT gate coupled to said first enable pulse source,
a second NAND gate coupled to said first source and the output of said first NOT gate, and
a third NAND gate coupled to the output of both said first and second NAND gates to provide said output data for transmission;
said receive phase locked loop includes
a fourth means to select said second given one of said predetermined number of different bit rates for a second clock signal,
a second phase comparator coupled to said third and fourth sources to compare said receive write timing signal to said receive read timing signal and to produce a second phase error signal,
an eighth source of second low frequency reference having said first given value,
a ninth source of second high frequency reference having said second given value,
tenth source of a delta frequency reference having a value equal to the difference between said first and second given values, fifth means coupled to said second phase comparator and said eight, ninth and tenth source to select one of said second low and second high frequency references at the rate of said second delta frequency reference as determined by said second phase error signal, and sixth means coupled to said fifth means to divide said selected one of said second low and second high frequency references to provide a receive system timing signal; and said diphase modulator includes
  a second enable pulse source,
  a D-type flip-flop having its T input coupled to said fourth means responsive to said second clock signal,
  a fourth NAND gate coupled to said second enable pulse source and said fourth means responsive to said second clock signal,
  a fifth NAND gate coupled to said second enable pulse source and the Q output of said D-type flip-flop,
  a sixth NAND gate coupled to said second source and the output of said fifth NAND gate,
  a first OR gate coupled to said second source and the output of said fifth NAND gate,
  a seventh NAND gate coupled between the output of both said sixth NAND gate and said first OR gate and the D input of said D-type flip-flop,
  a second NOT gate coupled to the output of said fourth NAND gate,
  an eighth NAND gate coupled to the $\overline{Q}$ output of said D-type flip-flop and said second NOT gate,
  a ninth NAND gate coupled to the Q output of said D-type flip-flop and said fourth NAND gate, and
  a second OR gate coupled to the output of both of said eighth and ninth NAND gates to provide said output data for utilization.

\* \* \* \* \*